United States Patent [19]

Mitchell et al.

[11] 3,949,515

[45] Apr. 13, 1976

[54] IN-FIELD BOLL WEEVIL TRAP

[75] Inventors: Earl B. Mitchell, Louisville; Dicky D. Hardee; Theodore B. Davich, both of Starkville, all of Miss.

[73] Assignee: The United States of America as represented by the Secretary of Agriculture, Washington, D.C.

[22] Filed: July 23, 1975

[21] Appl. No.: 598,493

[52] U.S. Cl. ............................................. 43/121
[51] Int. Cl.² ...................................... A01M 1/10
[58] Field of Search ................................... 43/121

[56] References Cited
UNITED STATES PATENTS

| 140,954 | 7/1873 | Rubarth | 43/121 |
| 1,959,808 | 5/1934 | Behan et al. | 43/121 |
| 2,255,360 | 9/1941 | Miller | 43/121 |

*Primary Examiner*—G. E. McNeill
*Assistant Examiner*—Daniel J. Leach
*Attorney, Agent, or Firm*—M. Howard Silverstein; Max D. Hensley

[57] ABSTRACT

A new improved apparatus for capturing boll weevils comprising a cylindrical base attached to a wire inverted funnel which leads into a rectangular or square clear retaining container with a grandlure attractant therein.

9 Claims, 1 Drawing Figure

U.S. Patent    April 13, 1976    3,949,515
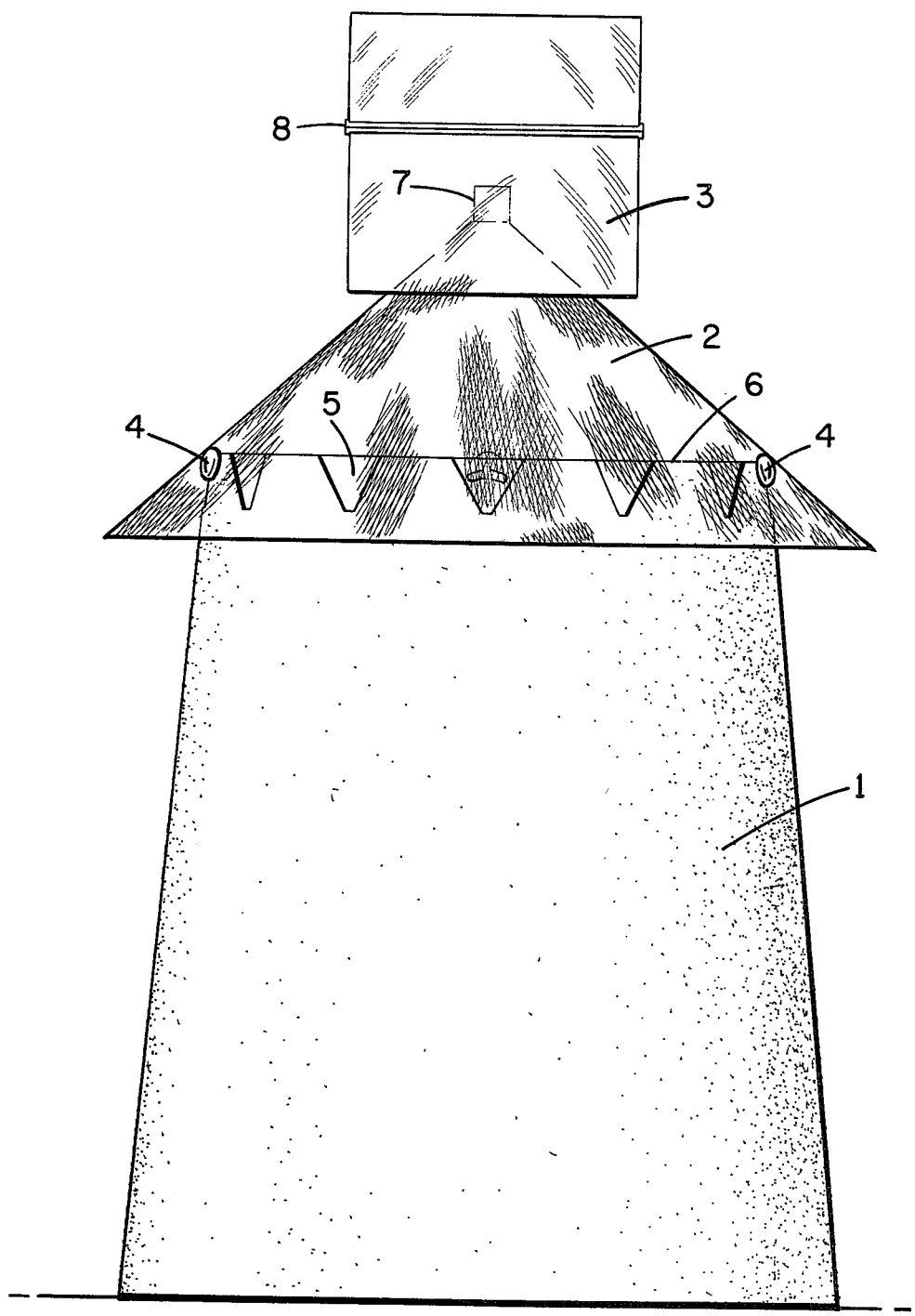

IN-FIELD BOLL WEEVIL TRAP

This invention relates to an apparatus for capturing boll weevils. More specifically, this invention relates to a very small, light weight apparatus capable of being used in cotton fields to capture live boll weevils during the normal insecticide application and cultivation period. Therefore, it accomplishes an improved insecticide program and thus better cotton production.

Prior art teaches that trapping efforts have not been satisfactory for capturing weevils (particularly females) during the critical reproduction period because they could not be placed in the field. This is a critical period due to the fact that the weevil population is low and efficient traps are necessary to ascertain adequate and prompt insecticide application. Prior art also teaches that there are many similar traps in use for considerable periods of time which trap boll weevils. However, this is the first such trap which will efficiently remain in the field during the early part of the planting season when weevil populations are low and yet not interfere with farm machinery working in the fields.

The main objective of this invention is to capture boll weevils.

Another object of the invention is to produce an apparatus capable of being used in cotton fields during the early planting stages.

A third object of the invention is to produce a light trap capable of being supported by very small cotton plants.

A fourth object of the invention is to produce a trap small enough to allow for tractors and farm equipment to work around without being moved.

A fifth object of the invention is to trap enough female boll weevils early enough in the growing season to establish an efficient insecticide program.

Other objects and advantages of this invention will further become apparent hereinafter and in the drawings, in which:

The single FIGURE is a front view of the in-field boll weevil trap.

In describing the preferred embodiment of the invention illustrated by the single Figure, specific terminology will be resorted to for the sake of clarity. However, it is not intended to be limited to the specific terms so selected, and it is to be understood that each specific term includes all technical equivalents which operate in a similar manner to accomplish a similar purpose.

Turning now to the specific embodiment of the invention selected for illustration in the drawing, the number 1 designates a cylindrical base which is painted fluorescent yellow to attract the weevils. It has been determined in the past that boll weevils are particularly attracted to the fluorescent yellow color. The base 1 must be 6–7 inches tall and be constructed of lightweight plastic, paper or other material with a top diameter of approximately 4 inches. Base 1 has a top 6 into which are cut openings 5. These openings allow responding weevils to crawl upward on the outside of base 1 as well as from underneath base 1 into funnel 2. Funnel 2 is made of wire mesh or screen or any clear material. It laps down over the top of base 1 about 1 inch and is secured to the base by fasteners 4 in at least 3 places. Paper brads or any other fastener is adequate for this purpose. The weevils crawl up funnel 2 and through funnel throat 7 and into capture chamber 3. Funnel throat 7 is approximately 3/16 inch in diameter. Boll weevils have a tendency to respond upward and not go back down the small opening. Capture container 3 is a clear container containing grandlure attractant (a pheromone) and is of any shape to hold the trapped weevils. It is secured to funnel 2 by heat, glue, solvent or any other method and is either detachable or has a lid for removing captured weevils. Part 8 represents the embodiment of a capture chamber which divides in half to allow for removal of the trapped weevils. All of the individual elements of the invention must be fabricated out of light weight materials.

Having thus described my invention, I claim:

1. An apparatus for capturing boll weevils comprising in combination:
   a. a base comprising an open bottom, cylindrical vertical sides, and a horizontal circular top affixed at its edge to the tip edge of the cylindrical vertical sides thus substantially forming an inverted cylinder with an open bottom allowing for movement of boll weevils up the sides due to,
   b. a grandlure attractant and
   c. a plurality of openings spaced around the top edge of said inverted cylinder to allow boll weevil entry into
   d. an inverted funnel attached to the top of the cylindrical base so that the edge of the inverted funnel overlaps the outer edge of the cylindrical base, said funnel affixed to the top edge of said cylindrical base, thus substantially forming a guide for the boll weevils up and through the funnel throat, said funnel throat end inserted into a
   e. clear capture chamber which is affixed to overlap the funnel throat end said clear capture chamber affixed and sealed to overlap the funnel throat end so that when the boll weevils enter the capture chamber they cannot return due to their nature to crawl upward.

2. The apparatus as defined in claim 1 wherein the cylindrical base is a cone approximately 6 to 7 inches tall and comprises any light weight material, and is painted yellow.

3. The apparatus as defined in claim 1 wherein the inverted funnel is made of wire mesh or any clear light weight material and has a throat diameter of approximately 3/16 inches in diameter.

4. The apparatus as defined in claim 1 wherein the overlap of the inverted funnel over the cylindrical base is a one-inch overlap.

5. The apparatus as defined in claim 1 wherein the fasteners which fasten the inverted funnel to the cylindrical base are paper brads and there is a minimum of three fasteners.

6. The apparatus as defined in claim 1 wherein the capture chamber is made of clear plastic or any other light weight material.

7. The apparatus as defined in claim 1 wherein there are 10 to 12 triangular openings at the top edge of the cylindrical base.

8. The apparatus as defined in claim 1 wherein the base is a cone.

9. The apparatus as defined in claim 1 wherein the grandlure attractant is a boll weevil pheromone.

* * * * *